United States Patent
Konda et al.

(10) Patent No.: US 11,866,593 B2
(45) Date of Patent: Jan. 9, 2024

(54) ULTRAVIOLET CURABLE INKJET INK

(71) Applicants: TOYO INK SC HOLDINGS CO., LTD., Tokyo (JP); TOYOCOLOR CO., LTD., Tokyo (JP)

(72) Inventors: Yohei Konda, Tokyo (JP); Gosuke Kikutsuji, Tokyo (JP)

(73) Assignees: TOYO INK SC HOLDINGS CO., LTD., Tokyo (JP); TOYOCOLOR CO., LTD., Tokyo (JP)

( * ) Notice: Subject to any disclaimer, the term of this patent is extended or adjusted under 35 U.S.C. 154(b) by 0 days.

(21) Appl. No.: 17/634,332

(22) PCT Filed: Aug. 11, 2021

(86) PCT No.: PCT/JP2021/029663
§ 371 (c)(1),
(2) Date: Feb. 10, 2022

(87) PCT Pub. No.: WO2022/137634
PCT Pub. Date: Jun. 30, 2022

(65) Prior Publication Data
US 2023/0002630 A1    Jan. 5, 2023

(30) Foreign Application Priority Data
Dec. 25, 2020  (JP) .................. 2020-216783

(51) Int. Cl.
*C09D 11/38* (2014.01)
*C09D 11/101* (2014.01)
*C09D 11/326* (2014.01)

(52) U.S. Cl.
CPC .......... *C09D 11/101* (2013.01); *C09D 11/326* (2013.01); *C09D 11/38* (2013.01)

(58) Field of Classification Search
CPC ... C09D 1/00; C09D 4/00; C09D 5/00; C09D 11/00; C09D 11/101; C09D 11/326; C09D 11/38
USPC ........ 16/31.6, 31.86; 106/31.01, 31.13, 31.6, 106/31.86
See application file for complete search history.

(56) References Cited

U.S. PATENT DOCUMENTS

| | | | |
|---|---|---|---|
| 2010/0112497 A1 | 5/2010 | Takabayashi et al. | |
| 2018/0030290 A1 | 2/2018 | Hirose et al. | |
| 2018/0244942 A1 | 8/2018 | Tsuyama et al. | |
| 2019/0284413 A1 | 9/2019 | Hasegawa et al. | |
| 2021/0301162 A1 | 9/2021 | Nakamura et al. | |

FOREIGN PATENT DOCUMENTS

| | | | | |
|---|---|---|---|---|
| CN | 106009917 A | * | 10/2016 | ......... C08G 18/3206 |
| GB | 2561985 A | | 10/2018 | |
| JP | 2007-099836 A | | 4/2007 | |
| JP | 2010-131975 A | | 6/2010 | |
| JP | 2013-001731 A | | 1/2013 | |
| JP | 2013-060548 A | | 4/2013 | |
| JP | 2015-030796 A | | 2/2015 | |
| JP | 2016-147998 A | | 8/2016 | |
| JP | 2016-160274 A | | 9/2016 | |
| JP | 2016194063 A | * | 11/2016 | |
| JP | 2018-24758 A | | 2/2018 | |
| JP | 2019-151703 A | | 9/2019 | |
| JP | 2019-163352 A | | 9/2019 | |
| JP | 2021-155465 A | | 10/2021 | |
| WO | 2017/086224 A1 | | 5/2017 | |
| WO | 2020/049378 A1 | | 3/2020 | |

OTHER PUBLICATIONS

Office Action issued from Japanese Patent Application No. 2020-216783 dated Jun. 22, 2021.
International Search Report for PCT/JP2021/029663 dated Oct. 26, 2021 (PCT/ISA/210).
Written Opinion for PCT/JP2021/029663 dated Oct. 26, 2021 (PCT/ISA/237).
Chinese Office Action dated Jun. 1, 2023 in Chinese Application No. 202180053305.7.

* cited by examiner

*Primary Examiner* — James E McDonough
(74) *Attorney, Agent, or Firm* — Sughrue Mion, PLLC

(57) ABSTRACT

By use of an ultraviolet curable inkjet ink comprising a colorant, a polymerizable monomer having a specific structure, ethoxyphenyl(2,4,6-trimethylbenzoyl)phosphine oxide, and at least one type selected from the group consisting of an acylphosphine oxide photopolymerization initiator different than the ethoxyphenyl(2,4,6-trimethylbenzoyl)phosphine oxide, a benzophenone photopolymerization initiator, and an indane photopolymerization initiator, wherein the ratio of the content of the polymerizable monomer having the specific structure and the content of the ethoxyphenyl(2,4,6-trimethylbenzoyl)phosphine oxide is 2:1 to 8.5:1 by mass ratio, the content of a monofunctional monomer in the ultraviolet curable inkjet ink is 25% by mass or less, a printed matter having curability and coating film flexibility can be obtained regardless of the amount applied to a recording medium, and the discharge stability is also excellent.

9 Claims, No Drawings

ULTRAVIOLET CURABLE INKJET INK

CROSS REFERENCE TO RELATED APPLICATIONS

This application is a National Stage of International Application No. PCT/JP2021/029663 filed Aug. 11, 2021, claiming priority based on Japanese Patent Application No. 2020-216783 filed Dec. 25, 2020, the entire contents of which are incorporated by reference herein.

TECHNICAL FIELD

The present invention relates to an ultraviolet curable inkjet ink.

BACKGROUND ART

Accompanying the decrease in printing lot size and the diversification of needs, the prevalence of digital printing methods has rapidly advanced. A plate is not required with digital printing methods, thus, it is possible to reduce costs and reduce the size of printing equipment.

The inkjet printing method which is one type of digital printing method is a method in which very fine liquid droplets of ink are jetted from an inkjet head and deposited onto a recording medium (substrate) and form images or text on the recording medium to obtain a recorded item (hereinafter, referred to as the "printed matter"). Compared with other digital printing methods, the inkjet printing method is superior from viewpoints such as the size and cost of the printing apparatus, the running costs during printing, and the ease of making full color printed matters. In recent years, the inkjet printing method has been increasingly used in industrial printing applications. Further, recently, as the performance of inkjet heads has improved, the application of inkjet printing methods to other known printing markets such as offset printing has also been anticipated, and inkjet printers for the existing printing market have actually begun to be marketed.

In the future, in order to increase the share of inkjet printing methods in the existing printing market, it will be necessary to support the printing of numerous text and images. For example, there are often numerous portions having different printing rates in a single primed matter. Therefore, it is necessary to create a printed matter having a comparable quality regardless of the amount of ink applied on the recording medium.

On the one hand, there are various types of inks used in the inkjet printing method such as aqueous-based, oil-based, solvent-based and, ultraviolet curable, but the demand for active energy ray-curable inkjet inks has been increasing due to characteristics such as the speed of the drying time and the strength of the cured film forming the print layer.

However, in the development of an ultraviolet curable inkjet printing method for the existing printing market, it is remarkably difficult to ensure the uniformity of the printed matter quality regardless of the amount of ink applied on the recording medium as stated above. For example, in a printed matter which uses an ultraviolet curable ink, differences in the curability and flexibility tend to occur due to the thickness of the ink layer. The reasons for this include the influence (oxygen inhibition) of atmospheric oxygen in the ink layer surface, and, the formation of three-dimensional crosslinks due to a (polyfunctional) polymerizable monomer having a plurality of polymerizable groups.

Furthermore, when using an ultraviolet curable inkjet printing method in an existing printing market, it is also necessary to support printing speeds which are equal or greater than the conventionally-used offset printing methods and the like. Generally, in order to support high speed printing with an ultraviolet curable inkjet printing method, it is necessary to improve the reactivity to ultraviolet rays which induce the polymerization reaction. For example, it is effective to use a polymerizable monomer having a large number of polymerizable groups in order to improve the aforementioned reactivity.

However, when a set amount of the polymerizable monomer having a large number of polymerizable groups was used, there was the problem that although the scratch resistance is excellent, the flexibility deteriorates and the printed matter becomes remarkably fragile due to the crosslink density of the cured ink layer becoming high.

In the first place, the viscosity of an ink for use with an inkjet printing method is preferably designed to a low viscosity for a smooth and stable discharge from the inkjet head. Therefore, it is necessary to use a low viscosity polymerizable monomer to design the ink, and in general, as the viscosity is high, there is a limit to the polymerizable monomers having a large number of polymerizable groups which are used.

As an examination in order to solve the aforementioned problems, for example, Patent Document 1 discloses a photocurable ink composition for an inkjet recording for ensuring the extensibility (flexibility) of an ink layer and suppressing wrinkling during film thickening, comprising a vinyl ether group-containing (meth)acrylate having a specific structure, a monofunctional (meth)acrylate, and, a polyfunctional (meth)acrylate and the like. However, Patent Document 1 focusses only on the curability of thick films, and does not consider the curability of thin films. As mentioned above, it can be said that the configuration disclosed in Patent Document 1 is insufficient in order to support the printing of numerous text and images.

On the other hand, Patent Document 2 discloses a configuration, as a photocurable ink for inkjet printing having excellent curability of a thin film when using an ultraviolet light-emitting diode, adhesion to a polyvinyl chloride sheet substrate, discharge stability and the like, containing 65 to 85 percent by mass of a monofunctional monomer containing a cyclic structure relative to a polymerizable monomer, and furthermore, containing an ether group-containing monofunctional monomer, an amino group-containing polyfunctional monomer, a monomer containing a trimethylol propane skeleton and the like. However, Patent Document 2 does not examine the curability of thick films as opposed to Patent Document 1. Furthermore, the aforementioned photocurable ink compositions for inkjet recording has a high content of the monofunctional monomer, thus, there is the risk that the curability will be insufficient when used under high-speed printing conditions.

As described above, an ink (ultraviolet curable ink for inkjet recording) which is used in an ultraviolet curable inkjet printing method with which a printed matter excellent in curability and flexibility of the coating film can be obtained regardless of the amount of ink applied on the recording medium and furthermore having an excellent discharge stability has not existed until now.

PRIOR ART DOCUMENTS

Patent Documents

Patent Document 1: JP 2013-060548 A
Patent Document 2 JP 2016-160274 A

SUMMARY OF THE INVENTION

Problems Invention Aims to Solve

The present invention has been made to solve the aforementioned problems, and the purpose of the present invention is to provide an ultraviolet curable inkjet ink (hereinafter, simply referred to as the "ink") with which a printed matter excellent in curability and coating film flexibility can be obtained regardless of the amount applied to the recording medium, and having excellent discharge stability.

Means for Solution of the Problems

In order to solve the aforementioned problems, the present inventors performed keen investigations, and as a result, discovered an ink having the configuration illustrated below, and completed the present invention.

Namely, an embodiment of the present invention relates to an ultraviolet curable inkjet ink comprising a colorant, a polymerizable monomer, and a photopolymerization initiator, wherein
the polymerizable monomer comprises a compound represented by the following General formula (A),
the photopolymerization initiator comprises
an ethoxyphenyl(2,4,6-trimethylbenzoyl)phosphine oxide, and
at least one type selected from the group consisting of an acylphosphine oxide photopolymerization initiator different than the ethoxyphenyl(2,4,6-trimethylbenzoyl)phosphine oxide, a benzophenone photopolymerization initiator, and an indane photopolymerization initiator,
the ratio of the content of the compound represented by General formula (A) and the content of the ethoxyphenyl(2,4,6-trimethylbenzoyl)phosphine oxide is by mass ratio 2:1 to 8.5:1, and
the content of the monofunctional monomer in the ultraviolet curable inkjet ink is 25% by mass or less.

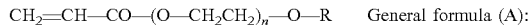  General formula (A):

(In General formula (A), R represents an acryloyl group or a vinyl group, and n represents an integer from 2 to 10.)

Further, another embodiment of the present invention relates to the aforementioned ultraviolet curable inkjet ink wherein the photopolymerization initiator of at least one type selected from the group consisting of the acylphosphine oxide photopolymerization initiator, the benzophenone photopolymerization initiator, and the indane photopolymerization initiator is an acylphosphine oxide photopolymerization initiator.

Further, another embodiment of the present invention relates to the aforementioned ultraviolet curable inkjet ink wherein the ratio of the content of the ethoxyphenyl(2,4,6-trimethylbenzoyl)phosphine oxide and the content of the acylphosphine oxide photopolymerization initiator is 0.5:1 to 3:1 by mass ratio.

Further, another embodiment of the present invention relates to the aforementioned ultraviolet curable inkjet ink which further comprises a polyether-modified siloxane surface modifier.

Further, another embodiment of the present invention relates to the aforementioned ultraviolet curable inkjet ink wherein R of the General formula (A) is an acryloyl group.

Effects of the Invention

The embodiments of the present invention can provide an active energy ray-curable inkjet ink with which a printed matter having excellent curability and coating film flexibility can be obtained regardless of the amount applied to the recording medium printed matter, and having an excellent discharge stability.

EMBODIMENTS FOR CARRYING OUT THE INVENTION

Below, the embodiments of the present invention will be explained in detail. In the embodiments of the present invention, unless specifically stated otherwise, "parts" and "%" represent "parts by mass" and "% by mass" respectively. Further, in the present description, descriptions such as "(meth)acrylate" and "(meth)acrylic" respectively mean "acrylate and/or methacrylate" and "acrylic and/or methacrylic".

[Ultraviolet Curable Inkjet Ink]

An ultraviolet curable inkjet ink (ultraviolet curable ink for inkjet recording) according to one embodiment comprises a colorant, a polymerizable monomer, and a photopolymerization initiator, wherein the polymerizable monomer comprises the compound represented by the following General formula (A), and the photopolymerization initiator comprises an ethoxyphenyl(2,4,6-trimethylbenzoyl)phosphine oxide, and at least one type selected from the group consisting of an acylphosphine oxide photopolymerization initiator different than the ethoxyphenyl(2,4,6-trimethylbenzoyl)phosphine oxide, a benzophenone photopolymerization initiator, and an indane photopolymerization initiator.

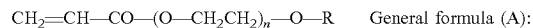  General formula (A):

In the aforementioned General formula (A), R represents an acryloyl group or a vinyl group, and n represents an integer from 2 to 10.

Generally, an acylphosphine oxide photopolymerization initiator can absorb ultraviolet rays of a wide range of wavelengths, and is an effective material for improving the curability not only at the ink surface, but also on the inside of the ink. Further, it is known that an ink containing an acylphosphine oxide photopolymerization initiator has an excellent curability compared to an ink containing other types of photopolymerization initiators. On the other hand, ethoxyphenyl(2,4,6-trimethylbenzoyl)phosphine oxide (hereinafter, referred to as "EO-TPO" in the present description) belonging to acylphosphine oxide photopolymerization initiators is inferior in terms of improving the curability compared to other acylphosphine oxide photopolymerization initiators (for example, bis(2,4,6-trimethylbenzoyl)-phenylphosphine oxide (hereinafter, referred to as "BTPO" in the present description), and, 2,4,6-trimethylbenzoyl-diphenylphosohine oxide (hereinafter, referred to as "TPO" in the present description)). The aromatic ring structure in the photopolymerization initiator molecule is involved in the absorption of ultraviolet rays, thus, it is considered that an EO-TPO having a lower number of aromatic ring structures than BTPO and TPO is inferior in terms of absorption ability of ultraviolet rays.

When using EO-TPO in an inkjet ink, conventionally, it was necessary to assist the curability with some other method. For example, increasing the amount of photopolymerization initiator in the ink can be considered but, there is the risk that increasing the photopolymerization initiator amount will lead to deterioration of the discharge stability.

Therefore, the present inventors performed keen research, and as a result, discovered that by combining EO-TPO with the compound represented by General formula (A) in a predetermined blending ratio, the curability is significantly improved without the excessive use of EO-TPO. The detailed mechanism of this is unclear, but the present inventors have the following speculation.

It is considered that EO-TPO and the compound represented by General formula (A) have a high affinity as both compounds have an ethoxy group, and EO-TPO is uniformly present in the ink along with the compound represented by General formula (A). Therefore, the radical generated from EO-TPO can react quickly with the compound represented by General formula (A) which exists in close proximity. Further, when a polymerizable monomer other than the compound represented by General formula (A) is present, the radical from the compound represented by General formula (A) is received and is involved in the growth reaction. In addition, as mentioned above, EO-TPO is an acylphosphine oxide photopolymerization initiator, and in the first place, is an effective material for improving the curability on the inside of an ink. Further, it is considered that EO-TPO exists uniformly on the inside of an ink along with the compound represented by General formula (A). As a result of the above, it is considered that curing progresses rapidly without differences in the curing speed occurring on the inside of an ink and on the ink surface, and both the curability and the coating film flexibility can be achieved.

However, in this case, if either EO-TPO or the compound represented by General formula (A) is present in excess, there is the risk that the curability and/or coating film flexibility will deteriorate due to the compound represented by General formula (A) being unable to receive the radical generated from EO-TPO, or, the radical which is necessary for the polymerization reaction of the compound represented by General formula (A) being present in an insufficient amount. Therefore, in the embodiment of the present invention, the content ration of EO-TPO and the compound represented by General formula (A) is prescribed at 2:1 to 8.5:1, and both the curability and the coating film flexibility are achieved.

Note that, even in the absence of an excessive amount of EO-TPO, a sufficient curability and coating film flexibility can be obtained by the presence of the compound represented by General formula (A) at a predetermined amount, thus, there is no risk of the aforementioned deterioration of the discharge stability. Further, it is considered that the interaction among the ethoxy groups which are present in the compound represented by General formula (A) causes the optimization of the microscopic viscoelasticity of the ink, and, the formation of an intermolecular chain network on the inside of the cured ink, and further improves the discharge stability and the coating film flexibility.

As described above the configuration of the embodiment of the present invention is indispensable in order to obtain the printed matter having an excellent curability and coating film flexibility regardless of the amount applied to the recording medium, and to obtain the ink having an excellent discharge stability.

Next, each component constituting the ink of the embodiment of the present invention be described in detail below.

<Polymerizable Monomer>

The polymerizable monomer has the functions which cause a polymerization or a crosslinking reaction an initiating species such as a radical generated from a photopolymerization initiator which will be described later, and which cures a composition comprising the polymerizable monomer.

As mentioned above, the ink of the embodiment of the present invention contains the compound represented by the following General formula (A) as the polymerizable monomer.

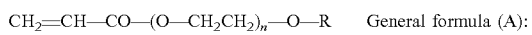

$$CH_2=CH-CO-(O-CH_2CH_2)_n-O-R \quad \text{General formula (A):}$$

In the aforementioned General formula (A), R represents an acrylolyl group or a vinyl group, and n represents an integer from 2 to 10.

As mentioned above, it is possible to achieve both the curability and the coating film flexibility by use of the compound represented by General formula (A) with EO-TPO. Further, further improvement of the discharge stability and the coating flexibility is anticipated by the interaction among the ethoxy groups.

Diethylene glycol diacrylate, triethylene glycol diacrylate, polyethylene glycol 200 diacrylate, polyethylene glycol 300 diacrylate, polyethylene glycol 400 diacrylate, 2-(2-vinyloxyethoxy)ethyl acrylate, 2-[2-(2-vinyloxyethoxy)ethoxy]ethyl acylate and the like may be mentioned as the compound represented by General formula (A).

In the embodiment of the present invention, a compound in which R in General formula (A) is an acryloyl group can be preferably used as the aforementioned compound represented by General formula (A). While the details are unclear, the use of the compound in which R in the General formula (A) is an acryloyl group can significantly improve all of the curability, the coating film flexibility, and the discharge stability, and the printed matter which can be used in a wide range of field such as label applications, corrugated cardboard applications, and building material applications can be obtained.

Among the aforementioned compounds represented by General formula (A) exemplified above, diethylene glycol diacrylate, triethylene glycol diacrylate, polyethylene glycol 200 diacrylate, polyethylene glycol 300 diacrylate, polyethylene glycol 400 diacrylate and the like may be provided as the compound in which R in General formula (A) is an acryloyl group.

As mentioned above, the content of the compound represented by General formula (A) is determined in accordance with the content of the EO-TPO, but in addition thereto, the content is preferably 15 to 100% by mass relative to all the polymerizable monomers in the ink, and more preferably 20 to 50% by mass. By maintaining the content within this range, the reactivity of the ink can be greatly improved while maintaining the flexibility of the coating film as is.

The ink of the embodiment of the present invention may also contain polymerizable monomers (hereinafter, referred to as the "other polymerizable monomers") other than the aforementioned compound represented by General formula (A).

The other polymerizable monomers are not specifically limited as long as they have characteristics of the aforementioned polymerizable monomer, and can be used regardless of the type of monomer, oligomer, or polymer. Specifically, in the embodiment of the present invention, a radical polymerizable monomer can be preferably used. Note that, the terms "oligomer" and "polymer" indicate polymers in which a plurality of monomers are bonded, and both are classified according to the degree of polymerization. Namely, in the present description, an "oligomer" is referred to as a compound in which the degree of polymerization is from 2 to 5, and a "polymer" is referred to as a compound in which the degree of polymerization is 6 or more.

Examples of the polymerizable group having a radical polymerizable monomer include a (meth) acryloyl group, a vinyl ether group, an allyl group, a vinyl group (however, the vinyl ether group and the allyl group are excluded), an unsaturated carboxylic acid group and the like. In the embodiment of the present invention, the radical polymerizable monomer may be a monofunctional compound, and may be a difunctional or more polyfunctional compound. Further, a single polymerizable monomer or a mixture of a plurality of polymerizable monomers may be used for the purpose of adjusting the reaction rate and the physical properties of the cured film and the ink. When the ratio of the monofunctional compound is high, the cured film tends to be flexible, and when the ratio of the polymerizable monomer is high, the curability tends to be excellent. Therefore, when using a plurality of polymerizable monomers, the ratio of the monofunctional compound and the polyfunctional compound is arbitrarily determined in accordance with the application.

Here, in the present description, the term "monofunctional" refers to a compound having only one polymerizable group in a molecule. Further the terms "difunctional" and "trifunctional" respectively refer to compounds having 2 or 3 polymerizable groups 1 in a molecule, and compounds which are difunctional or more will be collectively referred to as "polyfunctional".

Examples of the monofunctional monomer which can be used as another polymerizable monomer include compounds having one (meth) acryloyl group such as benzyl (meth) acrylate, 2-phenoxyethyl (meth)acrylate, (ethoxylated or propoxylated) 2-phenoxyethyl (meth)acrylate, dicyclopentenyl (oxyethyl) (meth)acrylate, phenoxy diethylene glycol (meth)acrylate, 2-methoxethyl (meth)acrylate, methoxy triethylene glycol (meth)acrylate, 2-ethoxyethyl (meth)acrylate, 2-(2-ethoxyethoxy)ethyl (meth)acrylate, methoxy dipropylene glycol (meth)acrylate, dipropylene glycol (meth)acrylate, nonylphenol EO-modified acrylate, nonylphenol PO-modified acrylate, o-phenylphenol EO-modified acrylate, 2-ethylhexyl EO-modified acrylate, β-carboxyethyl (meth)acrylate, trimethylolpropane formal (meth) acrylate, isoamyl (meth)acrylate, cyclohexyl (meth)acrylate, tetrahydrofurfuryl (meth)acrylate, isobornyl (meth)acrylate, norbornyl (meth)acrylate, dicyclopentanyl (meth)acrylate, isononyl (meth)acrylate, stearyl (meth)acrylate, n-octyl acrylate, isooctyl (meth)acrylate, lauryl (meth)acrylate, isodecyl (meth)acrylate, tridecyl (meth)acrylate, caprolactone (meth)acrylate, 2-hydroxy-3-phenoxypropyl (meth)acrylate, 1,4-cyclohexanedimethanol (meth)acrylate, 2-hydroxyethyl (meth)acrylate, 2-hydroxypropyl (meth)acrylate, 4-hydroxybutyl (meth)acrylate, acryloylmorpholine and N-acryloyloxyethyl hexahydrophthalimide. Further, N-vinylcaprolactam, N-vinylpyrrolidone and the like may be used as compounds having one vinyl group. Thereamong, from the viewpoint of improving the curability, 2-phenoxyethyl acrylate, nonylphenol EO-modified acrylate, lauryl acrylate, N-vinylcaprolactam and the like can be preferably used.

Further, examples of the difunctional monomer which can be used as another polymerizable monomer include compounds having two (meth) acryloyl groups such as 1,6-hexanediol di(meth)acrylate, ethoxylated (or propoxylated) 1.6-hexanediol di(meth)acrylate, 1,10-decanediol di(meth) acrylate, neopentyl glycol di(meth)acrylate, 2,4-dimethyl-1, 5-pentanediol di(meth)acrylate, 3-methyl-1,5-pentanediol di(meth)acrylate, butylethylpropanediol (meth)acrylate, ethoxylated cyclohexanemethanol di(meth)acrylate, ethylene glycol di(meth)acrylate, 2-ethyl-2-butylbutanediol di(meth)acrylate, hydroxypivalic acid neopentyl glycol di(meth)acrylate, EO-modified bisphenol A di(meth)acrylate, bisphenol F polyethoxy di(meth)acrylate, polypropylene glycol di(meth)acrylate, polyethylene glycol 600 di(meth)acrylate, 1,4-butanediol di(meth)acrylate, 2-ethyl-2-butylpropanediol di(meth)acrylate, 1,9-nonane di(meth) acrylate, propoxylated ethoxylated bisphenol A di(meth) acrylate, propoxylated bisphenol A di(meth)acrylate, ethoxylated bisphenol A di(meth)acrylate, ethoxylated bisphenol F di(meth)acrylate, isocyanuric acid EO-modified diacrylate, tricyclodecane di(meth)acrylate, dipropylene glycol di(meth)acrylate, tripropylene glycol di(meth)acrylate, PO-modified neopentyl glycol di(meth)acrylate, EO-modified neopentyl glycol di(meth)acrylate, dimethyloltricyclodecane di(meth)acrylate, cyclohexanedimethanol di(meth)acrylate, trimethylolpropane di(meth)acrylate, neopentyl glycol-modified trimethylolpropane di(meth)acrylate and dicyclopentanyl di(meth)acrylate.

Further, examples of the trifunctional monomer which can be used as another polymerizable monomer include compounds having three (meth)acryloyl groups such as trimethylolpropane tri(meth)acrylate, trimethylolethane tri(meth)acrylate, alkylene oxide-modified tri(meth)acrylates of trimethylolpropane (such as trimethylolpropane EO-modified triacrylate and trimethylolpropane PO-modified triacrylate), tetramethylolmethane tri(meth)acrylate, pentaerythritol tri(meth)acrylate, dipentaerythritol tri(meth)acrylate, trimethylolpropane tri((meth)acryloyloxypropyl) ether, isocyanuric acid alkylene oxide-modified tri(meth)acrylates, propionic acid dipentaerythritol tri(meth)acrylate, tri((meth) acryloyloxyethyl) isocyanurate, hydroxypivalaldehyde-modified dimethylolpropane tri(meth)acrylate, sorbitol tri (meth)acrylate, propoxylated trimethylolpropane tri(meth) acrylate, ethoxylated glycerol triacrylate and propoxylated glyceryl triacrylate. From the viewpoint of curability, trimethylolpropane triacrylate and trimethylolpropane EO-modified triacrylate are preferable.

Further, examples of the tetrafunctional monomer which can be used as another polymerizable monomer include compounds having four (meth)acryloyl groups such as pentaerythritol tetra(meth)acrylate, sorbitol tetra(meth)acrylate, ditrimethylolpropane tetra(meth)acrylate, propionic acid dipentaerythritol tetra(meth)acrylate, ethoxylated pentaerythritol tetra(meth)acrylate and tetramethylolmethane tetra(meth)acrylate. Thereamong, pentaerythritol tetraacrylate is preferable.

Further, examples of the pentafunctiortal monomer which can be used as another polymerizable monomer include compounds having five (meth)acryloyl groups such as sorbitol penta(meth)acrylate, dipentaerythritol penta(meth) acrylate, and EO-modified dipentaerythritol penta(meth) acrylate.

Further, examples of the hexafunctional monomer which can be used as another polymerizable monomer include compounds having six (meth)acryloyl groups such as dipentaerythritol hexa(meth)acrylate, EO-modified dipentaerythritol hexa(meth)acrylate, sorbitol hexa(meth)acrylate, alkylene oxide-modified hexa(meth)acrylates of phosphazene, ε-caprolactone-modified dipentaerythritol hexa(meth)acrylate. Thereamong, dipentaerythritol hexaacrylate and EO-modified dipentaerythritol hexa(meth)acrylateare preferable.

Note that, in the present description, the term "EO" refers to "ethylene oxide" and the term "PO" refers to "propylene oxide".

Further, when using a radical-polymerizable monomer as the other polymerizable monomer, a monomer having a (meth)acryloyl group can be preferably used as the polymerizable group. From the viewpoint of the balance between the flexibility and the curability, the number of polymerizable groups contained in the oligomer, is preferably 1 to 15 per molecule, more preferably 2 to 6, even more preferably 2 to 4, and 2 is particularly preferable. Further, the weight average molecular weight of the oligomer is preferably 400 to 10,000, and more preferably 500 to 5,000.

Examples of the oligomer having a (meth) acryloyl group which can be used as another polymerizable monomer include urethane (meth)acrylate oligomers such as aliphatic urethane (meth)acrylate oligomer and aromatic urethane (meth)acrylate oligomer, acrylic ester (meth)acrylate oligomer, polyester (meth)acrylate oligomer, and epoxy (meth)acrylate oligomer.

Among the aforementioned, the ink of the embodiment of the present invention preferably contains a difunctional monomer in addition to the compound represented by General formula (A). Further, from the viewpoints of the curability, the coating film flexibility, and the discharge stability, it is preferable to include a monomer (however, the compound represented by General formula (A) is excluded) whose main skeleton is an EO chain or PO chain as the other polymerizable monomer. Note that "a monomer whose main skeleton is an EO chain or PO chain" refers to a monomer comprising a EO chain or PO chain in a structure excluding the polymerizable group, and, in which the polymerizable group is directly bonded to the EO chain or PO chain.

Specific examples of the monomer whose main skeleton is an EO chain or PO chain include dipropylene glycol di(meth)acrylate, tripropylene glycol di(meth)acrylate, EO-modified neopentyl glycol di(meth)acrylate, PO-modified neopentyl glycol di(meth)acrylate, ethylene glycol di(meth)acrylate, polypropylene glycol di(meth)acrylate, EO-modified bisphenol A di(meth)acrylate, PO-modified neopentyl glycol di(meth)acrylate, EO-modified hexanediol di(meth)acrylate, PO-modified hexanediol di(meth)acrylate, EO-modified cyclohexanediol di(meth)acrylate, PO-modified cyclohexanediol di(meth)acrylate, and thereamong, from the viewpoints of having a low odor and the improvement of the discharge stability of the ink, dipropylene glycol di(meth)acrylate is preferably selected.

Further, when using a difunctional monomer other than the monomer whose main skeleton is an EO chain or PO chain, from the viewpoints of low viscosity, high reactivity, and a high discharge stability, 1,9-nonanediol diacrylate, 1,10-decanediol diacrylate, 3-methyl-1,5-pentanediol diacrylate, or neopentyl glycol-modified trimethylolpropane diacrylate are preferably used, and thereamong, from the viewpoints of having a low odor and the improvement of the discharge stability of the ink, 1,9-nonanediol diacrylate and 1,10-decanediol diacrylate are more preferably selected.

From the viewpoint of achieving both curability and discharge stability, the total amount (including the content of the aforementioned compound represented by General formula (A)) of the polymerizable monomer contained in the ink is preferably 50 to 95% by mass based on the entire amount of the ink, more preferably 60 to 95% by mass, and even more preferably 70 to 95% by mass.

From the viewpoints of the improvement of the discharge stability by making the ink to a low viscosity, and, the high reactivity and the reduction of the residual amount of the unreacted portion after curing, the total amount of the content of the difunctional monomer contained in the compound represented by General formula (A) is preferably 10 to 100% by mass based on all of the polymerizable monomer contained in the ink, more preferably 50 to 100% by mass, and particularly preferably 80 to 100% by mass.

Further, when using a trifunctional or greater monomer, the amount is preferably 10% by mass or less based on the entire amount of the ink, more preferably 7% by mass or less, even more preferably 5% by mass or less, and particularly preferably 2% by mass or less. If in the aforementioned range, it is possible to achieve both the curability and the discharge stability.

In the embodiment of the present invention, from the viewpoint of improvement of the curability, the amount of the monofunctional monomer is preferably 25% by mass or less (the monofunctional monomer does not have to be included) based on the ink, more preferably 15% by mass or less (the monofunctional monomer does not have to be included), even more preferably 10% by mass or less (the monofunctional monomer does not have to be included), and particularly preferably 5% by mass or less (the monofunctional monomer does not have to be included). Further, specifically, the monofunctional monomer is preferably substantially not included in the ink (specifically, made to 1% by mass or less based on the ink).

Further, when using an oligomer and/or polymer as the polymerizable monomer, from the viewpoints of the ink viscosity, the discharge stability, and the reduction of the residual amount of the unreacted portion after curing, the amount is preferably 10% by mass or less based on the entire amount of the ink, and more preferably 5% by mass or less.

<Photopolymerization Initiator>

The ink of the embodiment of the present invention contains ethoxyphenyl(2,4,6-trimethylbenzoyl)phosphine oxide (EO-TPO) as the photopolymerization initiator. As mentioned above, by use of EO-TPO with the compound represented by General formula (A), it is possible to obtain both the curability and the coating film flexibility. Further, EO-TPO is an acylphosphine oxide photopolymerization initiator, and is an effective material for improving the curability on the inside of the ink, and thus, further improvements of the coating film flexibility can be anticipated.

Note that, "ethoxyphenyl(2,4,6-trimethylbenzoyl)phosphine oxide" in the present description also includes a multimer (hereinafter, referred to as the "EO-TPO multimer" in the present description) of ethoxyphenyl(2,4,6-trimethylbenzoyl)phosphine oxide.

When using EO-TPO together with the compound represented by General formula (A), it is necessary to consider the blending ratios. Specifically, from the viewpoint of optimally obtaining both the curability and the coating film flexibility, the content ratio of the compound represented by General formula (A) and EO-TPO is optimally set to 2:1 to 8:1 by mass ratio. Further, from the viewpoint of further improving the aforementioned effect, the aforementioned content ratio is preferably set to 2:1 to 7:1 by mass ratio, more preferably 3:1 to 6:1, and even more preferably 3:1 to 5:1.

Note that, EO-TPO is commercially available. Specifically, "Omnirad TPO-L", "OMNIPOL TP" manufactured by IGM Holdings, Inc., "Speedcure TPO-L" manufactured by Lambson Limited, and "GR-TPO-L" manufactured by Hubei Gurun Technology Co., Ltd and the like may be provided. Note that, OMNIPOL TP is an EO-TPO multimer.

EO-TPO maybe used alone in the ink. Further, in order to further improve the curability and the coating film flexibility, EO-TPO may be used together with a photopolymerization initiator other than EO-TPO, namely, a photopolymerization initiator (hereinafter, referred to as the "other photopolymerization initiator") which is different than EO-TPO.

Specific examples of the other photopolymerization initiator include acylphosphine oxide-based photopolymerization initiators excluding EO-TPO, namely, an acylphosphine oxide-based photopolymerization initiator (hereinafter, referred to as the "other acylphosphine oxide photopolymerization initiator") which is different than EO-TPO, a benzophenone-based photopolymerization initiator, an indane-based photopolymerization initiator, a thioxanthone-based photopolymerization initiator, a hydroxyacetophenone-based photopolymerization initiator, an alkylaminoacetophenone-based photopolymerization initiator, an oxime ester-based photopolymerization initiator and the like.

In the present description, materials which promote the generation of radicals of other photopolymerization initiators which are generally referred to as sensitizers are included in the "polymerization initiator". Examples of this type of material include aminobenzoate-based compounds and anthracene-based compounds.

The other acylphosphine oxide photopolymerization initiators are commercially available, and for example, "Omnirad TPO" (commercial product of the aforementioned TPO), "Omnirad 819" (commercial product of the aforementioned BTPO) manufactured by IGM RESINS B.V. and the like may be provided. Further, the acylphosphine oxide photopolymerization initiators disclosed in, for example, WO 2017/086224 and WO 2020/049378 can be used.

Benzophenone photopolymerization initiators are commercially available, and for example, "Omnirad BP", "Omnirad BMS", "Ominirad 4PBZ", "OMNIRAD EMK", and "Esacure 1001M" manufactured by IGM RESINS B.V., and "GENOPOL BP-1", "GENOPOL BP-2" and the like manufactured by Rahn AG may be provided.

Indane photopolymerization initiators are commercially available, and for example, "SpeedCure XFs01" manufactured by LAMBSON LIMITED may be provided.

Thioxanthone-based photopolymerization initiators are commercially available, and for example, "Omnirad ITX", "Omnirad DETX" and the like manufactured by IGM RESINS B.V. may be provided.

Hydroxyacetophenone-based initiators are commercially available, and for example, "Omnirad 127", "Omnirad 184", "Ominirad 1173", "Omnirad 2050", "Esacure KIP150" and the like manufactured by IGM RESINS B.V. may be provided.

Alkylaminoacetophenone-based initiators are commercially available, and for example, "Omnirad 907", "Omnirad 369", "Omnirad 379" and the like manufactured by IGM RESINS B.V. may be provided.

Oxime ester-based initiators are commercially available, and for example, "IRGACURE OXE01", "IRGACURE OXE02", "IRGACURE OXE04" and the like manufactured by BASF Corporation may be provided.

Aminobenzoate-based compounds are commercially available, and for example, "Esacure A198", "Omnipol ASA" "Omnirad EDB", and "Omnirad EHA" manufactured by IGM RESINS B.V., and "GENOPOL AB-1", "GENOPOL AB-2" and the like manufactured by Rahn AG may be provided.

Anthracene-based compounds are commercially available, and for example, "ANTHRACURE UVS-581" and the like manufactured by Kawasaki Kasei Chemicals Ltd. may be provided.

In addition to the aforementioned exemplified initiators, examples of the other photopolymerization initiator include "Omnirad 651", "Omnirad MBF" and the like manufactured by IGM RESINS B.V.

Among the aforementioned exemplified initiators, the ink of the embodiment of the present invention preferably contains other acylphosphine oxide photopolymerization initiators in addition to EO-TPO. Due to the structural similarities with EO-TPO, it is considered that the other acylphosphine oxide photopolymerization initiators are uniformly present in the ink along with the EO-TPO, and as a result, it is considered to be an ink having a remarkably excellent curability of the surface and on the inside. In the case of the embodiment of the present invention, from the viewpoint of significantly improving the curability, it is particularly preferable to use BTPO as the other acylphosphine oxide photopolymerization initiator.

When using EO-TPO together with the other acylphosphine oxide, from the viewpoint of the compatibility between the photopolymerization initiator, the curability and the discharge stability, the blending ratio is preferably 0.5:1 to 3:1, more preferably 0.5:1 to 2.5:1, and particularly preferably 0.8:1 to 1.6:1.

On the other hand, it is also preferable to use EO-TPO together with a benzophenone photopolymerization initiator and/or indane photopolymerization initiator. While the detailed factors are unclear, it is considered that by also using the radicals generated from EO-TPO in the cleavage of the benzophenone photopolymerization initiator and/or the indane photopolymerization initiator and the generation of radicals, curing rapidly progresses without the occurrence of differences in the curing rate on the inside of the ink and the ink surface, and an ink having an excellent curability and coating film flexibility is obtained regardless of the amount applied to the recording medium.

<Polymerization Inhibitor>

It is possible to use a polymerization inhibitor in the ink of the embodiment of the present invention to increase the storage stability over time and suppress curling wrinkles and the curling over time of a printed matter. Hindered phenol-based compounds, phenol-based compounds, hydroquinone-based compounds, phenothiazine-based compounds, phosphorus-based compounds, and, nitrosophenylhydroxylamine-based compounds are preferably used as the polymerization inhibitor. Specific examples include 4-methoxyphenol, t-butylhydroquinone, 2,6-di-t-butyl-4-methylphenol, pentaerythritol tetrakis [3-(3,5-di-t-butyl-4-hydroxyphenyl) propionate], hydroquinone, methylhydroquinone, phenothiazine, dicumylphenothiazine, triphenylphosphine, aluminum salt of N-nitrosophenylhydroxylamine and the like. From the viewpoints of maintaining the curability, while increasing the storage stability, and, suppressing curling wrinkles and the curling over time of a printed matter, the content of the polymerization inhibitor is preferably 0.01 to 2% by mass relative to the total amount of ink, and more preferably 0.1 to 1% by mass.

<Colorant>

The ink of the embodiment of the present invention includes a colorant. Conventionally known dyes and pigments can be used as the colorant, and from the viewpoints of the concentration of the printed matter, and, improving the storage stability and the discharge stability of the ink, the use of a pigment is preferable.

The aforementioned pigment is not specifically limited, and for example, an organic or an inorganic pigment represented by the following color index can be used.

For example, as a red pigment, C.I. Pigment Red 5, 7, 12, 17, 48(Ca), 48(Mn), 49:2, 57(Ca), 57:1, 112, 122, 123, 147, 149, 150, 166, 168, 176, 177, 178, 184, 188, 202,209, 242, 255, 264, 266, 269, 282 and the like;

as a violet pigment. C.I. Pigment Violet 19 and the like,
as an orange pigment, C.I. Pigment Orange 5, 13, 34, 38, 43, 61, 62, 64 and the like;
as a blue pigment, C.I. Pigment Blue 1, 2, 3, 15:3, 15:4, 15:34, 16, 22, 60, C.I. Vat blue 4, 60 and the like;
as a green pigment, C.I. Pigment Green 7, 26, 36, 50, 58 and the like;
as a yellow pigment, C.I. Pigment Yellow 1, 2, 3, 12, 14, 16, 17, 73, 74, 75, 83, 93, 95, 97, 98, 109, 110, 114, 128, 129, 138, 139, 147, 150, 151, 154, 155, 180, 185, 213 and the like;
as a black pigment, C.I. Pigment Black 1, 7 and the like; and,
as a white pigment, C.I. Pigment White 6, 18, 21 and the like can be arbitrarily used in accordance with the desired color reproducibility and color development. Note that, two or more types of the aforementioned exemplified pigments may be used together.

The average particle size (D50) of the aforementioned pigment, when measured by a dynamic light-scattering method, is preferably 50 to 500 nm, and more preferably 100 to 400 nm. If the D50 is within this range, the color development (in the case of a white ink, the hiding power) and the storage stability and the discharge stability of the ink are excellent. Furthermore, it is possible to suppress the deterioration of the curability. Note that, the D50 represents the median diameter on a volume basis, and is a value obtained when the ink is diluted 200 to 1,000 fold with ethyl acetate, and the particle size is then measured using a dynamic light-scattering particle size distribution analyzer (for example, Nanotracc UPA-EX150" manufactured by MicrotracBEL Corp.).

Further, the content of the pigment in the ink can be appropriately selected according to the color of the ink and the purpose of use, but for example, is preferably 0.1 to 30% by mass relative to the total amount of ink. Further, from the viewpoints of color development, and the storage stability and discharge stability of the ink, excluding the case of a white ink, the content of the aforementioned pigment is preferably 0.5 to 15% by mass, and even more preferably 1 to 10% by mass. On the other hand, in the case of a white ink, the content of the aforementioned pigment is preferably 5 to 30% by mass, even more preferably 15 to 25% by mass.

Note that, in accordance with the desired application and image quality, the ink of the embodiment of the present invention can be made as a light-colored ink (for example, light yellow, light magenta, light cyan, and light black) in which the content of the pigment is small. In this case, the aforementioned exemplified pigment can be used as a colorant of a light-colored ink.

<Pigment Dispersing Resin>

When the ink of the embodiment of the present invention contains a pigment, a pigment dispersing resin can be used for the initial dispersibility and the storage stability of the pigment. The aforementioned pigment dispersing resin can be a commercially available resin, and a pigment synthesized by a conventionally know method can also be used. Specific examples of the commercial product include "Ajisper-PB-821" and "Ajisper-PB-822" manufactured by Ajinomoto Fine-Techno Co., Inc., "BYKJET-9150", "BYKJET-9151" and "BYKJET-9152" manufactured by BYK Chemie Japan KK, and "Solsperse 32000", "Solsperse 39000", "Solsperse J180" and "Solsperse J200" manufactured by Lubrizol Corporation and the like. Further, for example, a polymerizable monomer containing an acid group such as acrylic acid and methacrylic acid, a polymerizable monomer containing an amino group such as acrylamide, dimethylaminoethyl methacrylate, and diethylaminoethyl methacrylate, and, a copolymer of other polymerizable monomers may be used as the pigment dispersing resin in accordance with need.

The weight average molecular weight (hereinafter, referred to as Mw) of the aforementioned pigment dispersing resin is preferably 5,000 to 100,000, more preferably 10,000 to 50,000, and even more preferably 15,000 to 30,000. When the weight average molecular weight is in the aforementioned range, the compatibility of the pigment dispersing resin to the polymerizable monomer is good, and the storage stability of the ink improves. Further, the decrease in the glossiness of the printed matter due to the pigment dispersing resin is suppressed, and the color development improves.

Note that, the Mw can be determined by Gel Permeation Chromatography (hereinafter, GPC). Specifically, the Mw value can be obtained as a polystyrene equivalent molecular weight measured by a GPC (for example, "HLC-8320GPC" manufactured by Tosoh Corporation) fitted with an RI detector using a TSK gel column (manufactured by Tosoh Corporation) and using DMF in a developing solvent.

Further, the amine value of the pigment dispersing resin is preferably 5 to 50 mgKOH/g, more preferably 10 to 50 mgKOH/g, and even more preferably 20 to 45 mgKOH/g. Further, the acid value of the pigment dispersing resin is preferably 2 to 25 mgKOH/g, and more preferably 5 to 20 mgKOH/g. When the acid value and the amine value of the pigment dispersing resin are within the aforementioned ranges, the compatibility with the compound represented by General formula (A) improves, the storage stability and the discharge stability of the ink becomes better, and a printed matter having excellent color reproducibility can be obtained without mixing inks of different colors at the time of printing.

The "amine value" is the number of mg of hydrochloric acid and equivalent potassium hydroxide required to neutralize the basic nitrogen contained per 1 g of the dispersant solid fraction, and can be determined by the potentiometric titration method in accordance with JIS K 7237. As a specific example of the measurement method, the target resin was dissolved in tetrahydrofuran, and then potentiometric titration was performed using a 0.1 mol/L aqueous solution of hydrochloric acid. Moreover, the titration amount read from the obtained titration curve is used so that the amine value can be calculated by converting the amount to the number of mg of potassium hydroxide.

"The acid value" is the number of mg of potassium hydroxide required to neutralize 1 g of the dispersant solid fraction, and can be determined by the potentiometric titration method in accordance with JIS K 0070. As a specific example of the measurement method, the target resin was dissolved in a solvent in which diethyl ether and ethanol were mixed at a mass ratio of 1.1, and then potentiometric titration was performed using a 0.1 mol/L potassium hydroxide-ethanol solution. Moreover, the titration amount read from the obtained titration curve is used and the value can be calculated.

In a preferred embodiment, from the view points of the storage stability and the discharge stability, a pigment dispersing resin in which the Mw is 10,000 to 50,000, and, the amine value is 5 to 50 mgKOH/g can be particularly preferably used as the pigment dispersing resin.

Excluding the case of a white ink, the amount added of the pigment dispersing resin is preferably 20 to 120% by mass relative to the total amount of the pigment, and more preferably 30 to 80% by mass. Further, in the case of a white ink, the amount added of the pigment dispersing resin is preferably 1 to 100% by mass relative to the total amount of the pigment, and more preferably 3 to 50% by mass. By use of the pigment dispersing resin within the aforementioned blending amount range, the pigment dispersion having an excellent initial dispersibility and storage stability of the pigment can be obtained.

<Other Components>

In addition to the aforementioned components, the ink of the embodiment of the present invention can be used together with a surface modifier a solvent, and other additives. Furthermore, an ultraviolet light absorber, a fading inhibitor, a polymer compound and the like may also be used in accordance with need. Conventionally known components may be arbitrarily used as these components.

(Surface Modifier)

A surface modifier is preferably added to the ink of the embodiment of the present invention for the purpose of the improvement of the wet spreadability on the recording medium, the improvement of the adhesion, and, the prevention of cissing. Examples of the surface modifier include silicone-based surface modifiers, fluorine-based surface modifiers, acrylic-based surface modifiers, acetylene glycol-based surface modifiers and the like. Among these, from the viewpoints of the surface tension reduction ability, the improvement of the adhesion, and, the compatibility with the polymerizable monomer, a silicone-based surface modifier is preferably used.

Examples of the silicone-based surface modifier include compounds having a dimethylsiloxane structure, and/or, the modified products thereof. Thereamong, a polyether-modified siloxane surface modifier can be particularly preferably used. By use of a polyether-modified siloxane surface modifier, the ink which is deposited onto on the recording medium (substrate) can be sufficiently wet-spread, an interaction between the polyether group and the ethoxy group in the compound represented by General formula (A) occurs, so that it is possible to obtain both hardness and flexibility of the coating film, and, discharge stability. Note that, specific examples of the polyether include polyethylene oxide and polypropylene oxide. Further, only one polyether may be contained within the molecule, or both may be contained therein, but from the viewpoint of the interaction with the compound represented by General formula (A), it is preferable to have at least a polyethylene oxide structure. Examples of the commercial products of the polyether-modified siloxane surface modifier preferably include BYK (a registered trademark)-378, 348, 349, BYK-UV3500, and UV3510 manufactured by BYK Chemie Japan KK, and TEGO (a registered trademark) Glide 450, 440, 435, 432, 410, 406, 130, 110, and 100 manufactured by Evonik Industries and the like. Among these, from the viewpoints of the improvement of the adhesion and the image quality improvement of the printed matter, BYK-378, 348, and UV3510; and TEGO Glide 450, 440, 432, and 410 and the like can be particularly preferably used.

When using a silicone-based surface modifier, the content is preferably 0.1 to 5.0% by mass in the ink. By setting the content to 0.1% by mass or more, the wet spreadability on the recording medium can easily improve, and the adhesion also improves. On the one hand, by setting the content to 5.0% by mass or less, it is easy to maintain the storage stability and the discharge stability of the ink.

<Organic Solvent and Water>

An organic solvent and/or water may be used in the ink of the embodiment of the present invention in order to improve the reduction of the ink viscosity, and the wet spreadability on and the adhesion to the recording medium. When the ink contains an organic solvent and/or water, the content is preferably 0.01 to 30% by mass relative to the entire amount of the ink, more preferably 0.05 to 20% by mass, and even more preferably 0.1 to 10% by mass. Further, from the points of the dryness, and the wet spreadability on and the adhesion to the recording medium, in the case when an organic solvent is used, it is preferable to use a solvent having a boiling point of 140 to 300° C.

Examples of the organic solvent include alkylene glycol monoalkyl ether acetates, alkylene glycol diacetates, alkylene glycol monoalkyl ethers, alkylene glycol dialkyl ethers, alkanediols, lactams, lactones, other nitrogen-containing solvents, and other oxygen-containing solvents.

Thereamong, at least one type selected from the group consisting of alkylene glycol monoalkyl ethers, alkylene glycol dialkyl ethers, alkylene glycol monoalkyl ether acetates is preferably included. Specifically, tripropylene glycol monomethyl ether, dipropylene glycol monomethyl ether, propylene glycol monomethyl ether, ethylene glycol monobutyl ether, diethylene glycol monobutyl ether, triethylene glycol monobutyl ether, tetraethylene dialkyl ether, ethylene glycol monobutyl ether acetate, diethylene glycol diethyl ether are preferable, and at least one type selected from tetraethylene dialkyl ether, ethylene glycol monobutyl ether acetate, and, diethylene glycol diethyl ether is preferably included.

[Physical Properties of Ink]

The ink of the embodiment of the present invention preferably has a viscosity at 25° C. of 5 to 25 mPa·s, and more preferably 10 to 20 mPa·s. When the viscosity is 5 mPa·s or more, the discharge is good. When the viscosity is 25 mPa·s or less, there is little reduction in the image quality, with little reduction in the discharge precision. Furthermore, in order to impart the ink with the high-frequency applicability required for high-speed printing, the viscosity is preferably 8 to 14 mPa·s. Measurement of the viscosity can be performed using a TVE25L viscometer manufactured by Toki Sangyo Co., Ltd., by reading the viscosity at 50 rpm under an atmosphere at 25° C.

From the viewpoint of the balance between the discharge stability and dot formation reliability following impact, the surface tension at 25° C. is preferably from 20 mN/m to 50 mN/m, and more preferably from 25 mN/m to 40 mN/m. Measurement of the surface tension can be performed using an automatic surface tensiometer CBVP-Z manufactured by Kyowa Interface Science Co., Ltd., by verifying the surface tension when a platinum plate is wetted with the ink under an atmosphere at 25° C.

[Ink Production Method]

The ink of the embodiment of the present invention can be produced by a conventionally known method. For example, the ink can be produced as follows, but the production method of the ink is not limited to the following. First, a pigment as the colorant and a polymerizable monomer are mixed with a pigment dispersing resin, a surface modifier, a polymerization inhibitor, an organic solvent and/or water and the like in accordance with need, and then dispersed by a paint shaker, a sand mill, a roll mill, or a media-less dispersion device or the like to prepare a pigment dispersion.

Subsequently, after the remainder of the polymerizable monomer, a photopolymerization initiator containing EO-TPO, and, a surface modifier, a polymerization inhibitor, an organic solvent and/or water and the like in accordance with need were added to the obtained pigment dispersion to achieve the desired ink characteristics and mixed well, the mixture was filtered through a filter and the like to filter out the coarse particles, and prepare the ink.

When preparing the pigment dispersion, the pigment dispersion preferably includes 3 to 50% by mass of the pigment, more preferably 5 to 40% by mass, and particularly preferably 10 to 30% by mass.

Further, a difunctional monomer is preferably used as the polymerizable monomer used during the production of the pigment dispersion. Note that, the difunctional monomer may be the compound represented by General formula (A). Further, from the viewpoints of the storage stability, the viscosity, and the discharge stability of the pigment dispersion and the ink produced using the pigment dispersion, the difunctional monomer is preferably the compound represented by General formula (A) or is a monomer whose main skeleton is an EO chain or PO chain. Thereamong, from the viewpoint of storage stability, the ink preferably contains at least one type selected from the group consisting of dipropylene glycol diacrylate, and, 2-(2-vinyloxyethoxy)ethyl acrylate, and dipropylene glycol diacrylate is more preferably contained therein.

<Production Method of Printed Matter>

Examples of the production method of the printed matter which uses the ink of the embodiment of the present invention includes a method comprising a step for discharging the ink on a substrate (Step 1), and, a step for irradiating the substrate with ultraviolet rays from an ultraviolet ray irradiation means (Step 2).

Note that, in the embodiment of the present invention, a method for discharging and imparting the same ink from the same inkjet head a plurality of times to the same position on a substrate, namely, a method (multi-pass printing method) for subjecting the same position on a substrate to the aforementioned Step 1 a plurality of times may be utilized. However, from the viewpoint that the effect of the aforementioned embodiment of the present invention is sufficiently brought about, the case of the embodiment of the present invention preferably utilizes a method for discharging and imparting the same ink from the same inkjet head one time to the same position on a substrate, namely, a method (one pass printing method) for subjecting the same position on the substrate to the aforementioned Step 1 one time.

The one pass printing method can be implemented using for example, a line printer and the like. From the viewpoint that productivity and a printing layer having good quality are obtained, the printing speed at this time is preferably 20 to 150 m/min, and even more preferably 30 to 100 m/min.

(Recording Medium)

A resin film substrate or a paper substrate is preferably used as the recording medium used in the production method of the printed matter which uses the ink of the embodiment of the present invention. Further, a resin film substrate having a thickness of 10 to 90 μm, and, including, materials selected from the group consisting of polypropylene, polyethylene, polyethylene terephthalate, and, nylon is preferably selected. Coated paper, art paper, laminated paper and the like are preferably selected as the paper substrate. The ink in the embodiment of the present invention is suitably used for the printing of packages formed by the aforementioned exemplified recording medium, and specifically, is suitable for printing of the package which is for packing food.

Note that, "the resin film substrate including a material selected from the group consisting of polypropylene, polyethylene, polyethylene terephthalate, and, nylon" has a multi-layer structure, and, includes the resin film substrate (laminated film substrate) having at least one layer consisting of a material selected from the group consisting of polypropylene, polyethylene, polyethylene terephthalate, and nylon. Further, for the purpose of the improvement of the package strength, oxygen blocking and the like, there may be a layer consisting of AL (aluminum foil), VM film (aluminum deposited film and transparent vapor deposition film) and the like in the layer constituting the laminated film.

(Ink Discharge Means)

The ink of the present invention is for an inkjet recording. Therefore, a discharge means of the ink in Step 1 uses an inkjet head.

The drop volume of the ink which is discharged from the inkjet head which can be used in the embodiment of the present invention is preferably between 2 pl to 50 pl, and even more preferably between 3 pl to 20 pl. Further, the designed resolution of the inkjet head is preferably 600 dpi or more. Specifically, KJ4A-AA, KJ4A-TA, and KJ4A-RH manufactured by KYOCERA Corporation, Samba G3L manufactured by FUJI FILM Holdings Corporation, S3200, S1600, S800, I3200, and I1600 manufactured by Seiko Epson Corporation, KM1024i and KM1024 manufactured by KONICA MINOLTA, INC., and MH5320, MH5340, MH5240, and MH5440 manufactured by Ricoh Company, Ltd. and the like may be provided and may be suitably used as the inkjet head which satisfies the aforementioned conditions.

Further, the ink can be discharged while being heated by a heating device such as a heater provided in the inkjet head so that the ink of the embodiment of the present invention has a suitable viscosity. From the viewpoint of continuously and stably discharging the ink, heating so that the viscosity of the ink at the time of discharge is 20 mPa·s or less is preferable, and heating so that the viscosity is 15 mPa·s or less is even more preferable.

(Ultraviolet Ray Irradiation Means)

Examples of the ultraviolet ray irradiation means used in Step 2 include high-pressure mercury lamps, ultra-high-pressure mercury lamps, metal halide lamps, excimer laser lamps, xenon lamps, ultraviolet light emitting diodes (UV-LED) and the like.

[Ultraviolet Light Emitting Diode]

Among the ultraviolet ray irradiation means, the UV-LED has characteristics such as a narrow ultraviolet light wavelength region to be irradiated and the ease of miniaturization. Therefore, the irradiation wavelength and method of use of the UV-LED can be arbitrarily adjusted to some extent in accordance with the characteristics of the photopolymerization initiator and the colorant contained in the ink. The peak wavelength of the UV-LED used in Step 2 is preferably 280 to 420 nm, and particularly preferably 320 to 400 nm.

Further, due to its small size, a plurality of UV-LEDs can be arranged in parallel. Therefore, a plurality of LEDs can be arranged in parallel and used to increase the irradiation intensity to the recording medium. Note that, at this time, a plurality of UV-LEDs having different peak wavelengths may be used in parallel. Further, in Step 2, an ultraviolet ray irradiation means other than a UV-LED such as an ultraviolet lamp which will be described later may be used together with the UV-LED.

[Ultraviolet Lamp]

Further, when using an ultraviolet ray irradiation means (ultraviolet lamp) other than the UV-LED as an ultraviolet ray irradiation means, from the viewpoint that ultraviolet light can be efficiently emitted in the UV-A region and the irradiated light can sufficiently reach the inside of the ink coating, a metal halide lamp is preferably used. Note that, the ultraviolet lamp can be used in combination with the aforementioned UV-LED.

In Step 2, the maximum illuminance of the ultraviolet light on the recording medium is preferably 80 mW/cm$^2$ or more, and more preferably 120 mW/cm$^2$ or more. Further, the integrated light quantity when irradiating on the recording medium differs depending on the type and the content of the polymerizable monomer and the photopolymerization initiator, but is preferably 100 mJ/cm$^2$ or more, more preferably 150 mJ/cm$^2$ or more, and even more preferably 200 mJ/cm$^2$ or more.

Furthermore, after the end of Step 1, the time until Step 2 starts (the time after the ink was adhered to the recording medium until the irradiation of the ultraviolet light starts) is preferably 0.03 to 3 seconds, more preferably 0.04 to 2.5 seconds, and even more preferably 0.06 to 2 seconds. The dot formability of the ink becomes good thereby, and it is possible to obtain a printed matter having good quality without mixing the inks together.

[[Ink Set]]

In the embodiment of the present invention, a plurality of inks having different colors may be prepared and used as an ink set. Note that, all of the inks constituting the ink set preferably satisfy the requirements of the aforementioned embodiment of the present invention.

When using an ink set to manufacture a printed matter, Step 1 is performed for only the number of inks constituting the ink set, and then Step 2 may be performed However in the case of the embodiment of the present invention, from the viewpoint of improvement of the quality of the printed matter, it is preferable to perform Step 2 every time Step 1 is performed.

<Temporary Curing>

The expression "perform Step 2 every time Step 1 is performed" refers to an ink deposited onto recording medium, and then irradiated with ultraviolet rays from the ultraviolet ray irradiation means to partially cure the ink on the recording medium prior to the next ink being deposited, and generally is referred to as "temporary curing". When performing temporary curing in the embodiment of the present invention, the ultraviolet ray irradiation means used in the temporary curing is preferably a UV-LED. Further, in temporary curing, the maximum illuminance of the ultraviolet light on the recording medium is preferably 2 to 20 mW/cm$^2$, and more preferably 5 to 15 mW/cm$^2$.

EXAMPLES

The present invention will be described in further detail below. The following examples do not limit the scope of rights of the present invention in any way. Further, unless otherwise stated, the term "parts" indicates parts by mass and "%" indicates % by mass.

1. Production of the Ink

Prior to preparing the ink, the black pigment dispersion was produced. The black pigment dispersion A was produced by stirring 20 parts of the pigment ("Special Black 350" manufactured by Orion Engineered Carbons), 10 parts of the pigment dispersing resin ("Solsperse 32000" manufactured by Lubrizol Corporation), and 70 parts of the dipropylene glycol diacrylate (DPGDA, "SR508" manufactured by Arkema S.A.) in a high-speed mixer until a uniform mixture was obtained, and then dispersing in a horizontal sand mill for about one hour.

Further, with the exception that ethylene glycol diacrylate (manufactured by FUJIFILM Wako Pure Chemical Corporation) or PO-modified neopentyl glycol diacrylate (manufactured by Sartomer Co., Ltd., number of moles of PO group added: 2) was used in place of the dipropylene glycol diacrylate, black pigment dispersion B, and, black pigment dispersion C were respectively prepared using the same raw materials and methods as the aforementioned black pigment dispersion A.

Subsequently, the polymerizable monomer, the photopolymerization initiator, the polymerization inhibitor, and the surface modifier were sequentially added to the prepared black pigment dispersion while stirring to obtain the formulations shown in Table 1, and the photopolymerization initiator was gently mixed until it dissolved. Moreover, a black ink was obtained by filtering with a membrane filter having a 1 µm pore size and removing the coarse particles. Note that, the addition of each of the aforementioned raw materials may be performed in any sequence.

TABLE 1

|  |  |  |  | Example 1 | Example 2 | Example 3 | Example 4 | Example 5 | Example 6 | Example 7 | Example 8 |
|---|---|---|---|---|---|---|---|---|---|---|---|
| Black pigment dispersion | | | Type | A | B | C | A | A | A | A | A |
| | | | Addition amount | 12.5 | 12.5 | 12.5 | 12.5 | 12.5 | 12.5 | 12.5 | 12.5 |
| Polymerizable monomer | Compound represented by General formula (A) | | Photomer 4050 | 20 | 20 | 20 | 20 | 15 | 20 | 20 | 15 |
| | | | Photomer 4054 | | | | | | | | |
| | | | VEEA | | | | | 5 | | | |
| | Other polymerizable monomer | EO chain/PO chain as main skeleton | Miramer M286 | | | | | | | | |
| | | | EGDA | | 55 | | | | | | |
| | | | SR506 | 55 | | | | | 55 | 58.5 | 58.5 | 60 |
| | | Difunctional monomer | NPG(PO)DA | | | 55 | | | | | |
| | | Other components | Photomer 4017 | | | | | 55 | | | |
| | | | PEA | | | | | | | | |
| | | | TMP(EO)TA | | | | | | | | |
| Photopolymerization initiator | EO-TPO | | Omnirad TPO-L | 5 | 5 | 5 | 5 | 5 | 5 | 5 | |
| | | | OMNIPOL TP | | | | | | | | 3 |
| | Other acylphosphine oxide-based | | Omnirad 819 | 3.5 | 3.5 | 3.5 | 3.5 | 3.5 | | | 5 |
| | | | Omnirad TPO | | | | | | | 3.5 | |
| | | | Omnirad 403 | | | | | | | | 3.5 |

TABLE 1-continued

|  |  |  | | | | | | | | |
|---|---|---|---|---|---|---|---|---|---|---|
|  | Benzophenone-based | Omnirad BMS | | | | | | | | |
|  | Indane-based | SpeedCure XFs01 | | | | | | | | |
|  | Alkylaminoacetophenone-based | Omnirad 379 | 3.5 | 3.5 | 3.5 | 3.5 | 3.5 | | | 4 |
|  | Aminobenzoate-based | Esacure A198 | | | | | | | | |
|  |  | GENOPOL AB-2 | | | | | | | | |
| Polymerization inhibitor | | BHT | 0.1 | 0.1 | 0.1 | 0.1 | 0.1 | 0.1 | 0.1 | 0.1 |
| Surface modifier | | BYK UV3510 | 0.4 | 0.4 | 0.4 | 0.4 | 0.4 | 0.4 | 0.4 | 0.4 |
|  |  | BYK 361N | | | | | | | | |
| Total amount | | | 100 | 100 | 100 | 100 | 100 | 100 | 100 | 100 |
| Ratio | Formula (A) compound/EO-TPO ratio | | 4.0 | 4.0 | 4.0 | 4.0 | 4.0 | 4.0 | 4.0 | 5.0 |
|  | EO-TPO/Other acylphosphine oxide ratio | | 1.4 | 1.4 | 1.4 | 1.4 | 1.4 | 1.4 | 1.4 | 0.6 |
| Evaluation result | Thick film curability | | 5 | 5 | 5 | 5 | 5 | 4 | 4 | 4 |
|  | Thin film curability | | 5 | 5 | 5 | 5 | 5 | 5 | 4 | 5 |
|  | Flexibility | | 5 | 5 | 5 | 5 | 4 | 5 | 5 | 5 |
|  | Continuous discharge stability | | 5 | 4 | 4 | 5 | 5 | 5 | 5 | 3 |

|  |  |  | Example 9 | Example 10 | Example 11 | Example 12 | Example 13 | Example 14 | Example 15 | Example 16 |
|---|---|---|---|---|---|---|---|---|---|---|
| Black pigment dispersion | | Type | A | A | A | A | A | A | A | A |
|  |  | Addition amount | 12.5 | 12.5 | 12.5 | 12.5 | 12.5 | 12.5 | 13.9 | 12.5 |
| Polymerizable monomer | Compound represented by General formula (A) | Photomer 4050 | 20 | 20 | 20 | | 10 | 8 | | 5 |
|  |  | Photomer 4054 | | | | 10 | | | | |
|  |  | VEEA | | | | 10 | 10 | | 11.1 | 15 |
|  | Other polymerizable monomer | EO chain/PO chain as main skeleton | Miramer M286 | | | | | | | |
|  |  | EGDA | | | | | | | | |
|  | Difunctional monomer | SR506 | 55 | 55 | 55 | 55 | 55 | 69 | 61.1 | 55 |
|  |  | NPG(PO)DA | | | | | | | | |
|  | Other components | Photomer 4017 | | | | | | | | |
|  |  | PEA | | | | | | | | |
|  |  | TMP(EO)TA | | | | | | | | |
| Photo polymerization initiator | EO-TPO | Omnirad TPO-L | | 5 | 5 | 5 | 5 | 2.5 | 5.6 | 5 |
|  |  | OMNIPOL TP | 3 | | | | | | | |
|  | Other acylphosphine oxide-based | Omnirad 819 | | 3.5 | | 3.5 | 3.5 | 3 | 3.9 | 3.5 |
|  |  | Omnirad TPO | 4 | | | | | | | |
|  |  | Omnirad 403 | | | | | | | | |
|  | Benzophenone-based | Omnirad BMS | | 3.5 | 3.5 | | | 2.5 | | |
|  | Indane-based | SpeedCure XFs01 | | | 3.5 | | | | | |
|  | Alkylaminoacetophenone-based | Omnirad 379 | 5 | | | 3.5 | 3.5 | 2 | 3.9 | 3.5 |
|  | Aminobenzoate-based | Esacure A198 | | | | | | | | |
|  |  | GENOPOL AB-2 | | | | | | | | |
| Polymerization inhibitor | | BHT | 0.1 | 0.1 | 0.1 | 0.1 | 0.1 | 0.1 | 0.1 | 0.1 |
| Surface modifier | | BYK UV3510 | 0.4 | 0.4 | 0.4 | 0.4 | 0.4 | 0.4 | 0.4 | 0.4 |
|  |  | BYK 361N | | | | | | | | |
| Total amount | | | 100 | 100 | 100 | 100 | 100 | 100 | 100 | 100 |
| Ratio | Formula (A) compound/EO-TPO ratio | | 6.7 | 4.0 | 4.0 | 4.0 | 4.0 | 3.2 | 2.0 | 4.0 |
|  | EO-TPO/Other acylphosphine oxide ratio | | 0.8 | 1.4 | — | 1.4 | 1.4 | 0.8 | 1.4 | 1.4 |
| Evaluation result | Thick film curability | | 3 | 5 | 3 | 5 | 5 | 4 | 5 | 5 |
|  | Thin film curability | | 4 | 5 | 4 | 4 | 4 | 4 | 4 | 4 |
|  | Flexibility | | 5 | 5 | 5 | 5 | 4 | 4 | 4 | 4 |
|  | Continuous discharge stability | | 4 | 5 | 5 | 4 | 5 | 3 | 5 | 5 |

|  |  |  | Example 17 | Example 18 | Example 19 | Example 20 | Example 21 | Example 22 | Example 23 | Example 24 |
|---|---|---|---|---|---|---|---|---|---|---|
| Black pigment dispersion | | Type | A | A | A | A | A | A | A | A |
|  |  | Addition amount | 15.6 | 12.5 | 12.5 | 12.5 | 12.5 | 12.5 | 12.5 | 12.5 |
| Polymerizable monomer | Compound represented by General formula (A) | Photomer 4050 | | 15 | 15 | 20 | 30 | 30 | 32.5 | 14 |
|  |  | Photomer 4054 | | 5 | | | | | | |
|  |  | VEEA | 12.5 | | | 10 | | 5 | 10 | |
|  | Other polymerizable monomer | EO chain/PO chain as main skeleton | Miramer M286 | | | | | | | |
|  |  | EGDA | | | | | | | | |
|  | Difunctional monomer | SR506 | 56.2 | 55 | 62.7 | 45 | 45 | 40 | 34 | 59 |
|  |  | NPG(PO)DA | | | | | | | | |
|  | Other components | Photomer 4017 | | | | | | | | |
|  |  | PEA | | | | | | | | |
|  |  | TMP(EO)TA | | | | | | | | |
| Photo polymerization initiator | EO-TPO | Omnirad TPO-L | 6.3 | 5 | 7.5 | 10 | 5 | 5 | 5 | 3.5 |
|  |  | OMNIPOL TP | | | | | | | | |
|  | Other acylphosphine oxide-based | Omnirad 819 | 4.4 | 3.5 | 0.8 | 1 | 3.5 | 3.5 | 3.2 | 7 |
|  |  | Omnirad TPO | | | | | | | | |
|  |  | Omnirad 403 | | | | | | | | |

TABLE 1-continued

|  |  |  |  |  |  |  |  |  |  |  |
|---|---|---|---|---|---|---|---|---|---|---|
|  | Benzophenone-based | Omnirad BMS |  |  |  |  |  |  |  |  |
|  | Indane-based | SpeedCure XFs01 |  |  |  |  |  |  |  |  |
|  | Alkylaminoacetophenone-based | Omnirad 379 | 4.4 | 3.5 | 1 | 1 | 3.5 | 3.5 | 2.3 | 3.5 |
|  | Aminobenzoate-based | Esacure A198 |  |  |  |  |  |  |  |  |
|  |  | GENOPOL AB-2 |  |  |  |  |  |  |  |  |
| Polymerization inhibitor |  | BHT | 0.1 | 0.1 | 0.1 | 0.1 | 0.1 | 0.1 | 0.1 | 0.1 |
| Surface modifier |  | BYK UV3510 | 0.5 | 0.4 | 0.4 | 0.4 | 0.4 | 0.4 | 0.4 | 0.4 |
|  |  | BYK 361N |  |  |  |  |  |  |  |  |
| Total amount |  |  | 100 | 100 | 100 | 100 | 100 | 100 | 100 | 100 |
| Ratio | Formula (A) compound/EO-TPO ratio |  | 2.0 | 4.0 | 2.0 | 3.0 | 6.0 | 7.0 | 8.5 | 4.0 |
|  | EO-TPO/Other acylphosphine oxide ratio |  | 1.4 | 1.4 | 9.4 | 10.0 | 1.4 | 1.4 | 1.6 | 0.5 |
| Evaluation result | Thick film curability |  | 5 | 5 | 5 | 5 | 4 | 3 | 3 | 5 |
|  | Thin film curability |  | 4 | 5 | 5 | 5 | 5 | 4 | 3 | 5 |
|  | Flexibility |  | 4 | 5 | 3 | 4 | 5 | 5 | 5 | 4 |
|  | Continuous discharge stability |  | 4 | 4 | 3 | 3 | 3 | 4 | 4 | 3 |

|  |  |  | Example 25 | Example 26 | Example 27 | Example 28 | Example 29 | Example 30 | Example 31 | Example 32 |
|---|---|---|---|---|---|---|---|---|---|---|
| Black pigment dispersion |  | Type | A | A | A | A | A | A | A | A |
|  |  | Addition amount | 12.5 | 12.5 | 12.5 | 12.5 | 12.5 | 12.5 | 12.5 | 12.5 |
| Polymerizable monomer | Compound represented by General formula (A) | Photomer 4050 | 15 | 17 | 22 | 20 | 24 |  |  |  |
|  |  | Photomer 4054 |  |  |  |  |  |  |  |  |
|  |  | VEEA |  |  |  |  |  | 20 | 20 | 30 |
|  | Other polymerizable monomer | EO chain/PO chain as main skeleton | Miramer M286 |  |  |  |  |  |  |  |  |
|  |  |  | EGDA |  |  |  |  |  |  |  |  |
|  |  |  | SR506 | 58.8 | 57.3 | 52.5 | 56.5 | 51.5 | 55 | 55 | 43.5 |
|  |  | Difunctional monomer | NPG(PO)DA |  |  |  |  |  |  |  |  |
|  |  | Other components | Photomer 4017 |  |  |  |  |  |  |  |  |
|  |  |  | PEA |  |  |  |  |  |  |  |  |
|  |  |  | TMP(EO)TA |  |  |  |  |  |  |  |  |
| Photo polymerization initiator | EO-TPO | Omnirad TPO-L | 3.7 | 4.2 | 5.5 | 5 | 6 | 5 | 5 | 5 |
|  |  | OMNIPOL TP |  |  |  |  |  |  |  |  |
|  | Other acylphosphine oxide-based | Omnirad 819 | 6 | 5 | 3.5 | 2 | 2 | 3.5 | 3.5 | 5 |
|  |  | Omnirad TPO |  |  |  |  |  |  |  |  |
|  |  | Omnirad 403 |  |  |  |  |  |  |  |  |
|  | Benzophenone-based | Omnirad BMS |  |  |  |  |  |  | 3.5 | 3.5 |
|  | Indane-based | SpeedCure XFs01 |  |  |  |  |  |  |  |  |
|  | Alkylaminoacetophenone-based | Omnirad 379 | 3.5 | 3.5 | 3.5 | 3.5 | 3.5 | 3.5 |  |  |
|  | Aminobenzoate-based | Esacure A198 |  |  |  |  |  |  |  |  |
|  |  | GENOPOL AB-2 |  |  |  |  |  |  |  |  |
| Polymerization inhibitor |  | BHT | 0.1 | 0.1 | 0.1 | 0.1 | 0.1 | 0.1 | 0.1 | 0.1 |
| Surface modifier |  | BYK UV3510 | 0.4 | 0.4 | 0.4 | 0.4 | 0.4 | 0.4 | 0.4 | 0.4 |
|  |  | BYK 361N |  |  |  |  |  |  |  |  |
| Total amount |  |  | 100 | 100 | 100 | 100 | 100 | 100 | 100 | 100 |
| Ratio | Formula (A) compound/EO-TPO ratio |  | 4.1 | 4.0 | 4.0 | 4.0 | 4.0 | 4.0 | 4.0 | 6.0 |
|  | EO-TPO/Other acylphosphine oxide ratio |  | 0.6 | 0.6 | 1.6 | 2.5 | 3.0 | 1.4 | 1.4 | 1.0 |
| Evaluation result | Thick film curability |  | 5 | 5 | 5 | 4 | 3 | 4 | 5 | 5 |
|  | Thin film curability |  | 5 | 5 | 5 | 3 | 3 | 3 | 4 | 5 |
|  | Flexibility |  | 4 | 5 | 5 | 5 | 5 | 3 | 4 | 4 |
|  | Continuous discharge stability |  | 3 | 5 | 5 | 5 | 4 | 5 | 5 | 4 |

|  |  |  | Example 33 | Example 34 | Example 35 | Example 36 | Example 37 | Example 38 | Example 39 | Example 40 |
|---|---|---|---|---|---|---|---|---|---|---|
| Black pigment dispersion |  | Type | A | A | A | A | A | A | A | A |
|  |  | Addition amount | 12.5 | 12.5 | 12.5 | 12.5 | 12.5 | 12.5 | 12.5 | 12.5 |
| Polymerizable monomer | Compound represented by General formula (A) | Photomer 4050 | 20 | 20 | 20 | 20 | 20 | 20 | 20 | 20 |
|  |  | Photomer 4054 |  |  |  |  |  |  |  |  |
|  |  | VEEA |  |  |  |  |  |  |  |  |
|  | Other polymerizable monomer | EO chain/PO chain as main skeleton | Miramer M286 |  |  |  |  |  |  |  |  |
|  |  |  | EGDA |  |  |  |  |  |  |  |  |
|  |  |  | SR506 | 30 | 35 | 45 | 50 | 43 | 55 | 55 | 55 |
|  |  | Difunctional monomer | NPG(PO)DA |  |  |  |  |  |  |  |  |
|  |  | Other components | Photomer 4017 |  |  |  |  |  |  |  |  |
|  |  |  | PEA | 25 | 20 | 10 | 5 |  |  |  |  |
|  |  |  | TMP(EO)TA |  |  |  |  | 12 |  |  |  |
| Photo polymerization initiator | EO-TPO | Omnirad TPO-L | 5 | 5 | 5 | 5 | 5 | 5 | 5 | 5 |
|  |  | OMNIPOL TP |  |  |  |  |  |  |  |  |
|  | Other acylphosphine oxide-based | Omnirad 819 | 3.5 | 3.5 | 3.5 | 3.5 | 3.5 | 3.5 | 3.5 | 3.5 |
|  |  | Omnirad TPO |  |  |  |  |  |  |  |  |
|  |  | Omnirad 403 |  |  |  |  |  |  |  |  |

TABLE 1-continued

|  |  |  |  |  |  |  |  |  |  |
|---|---|---|---|---|---|---|---|---|---|
|  | Benzophenone-based | Omnirad BMS |  |  |  |  |  |  |  |
|  | Indane-based | SpeedCure XFs01 |  |  |  |  |  |  |  |
|  | Alkylaminoacetophenone-based | Omnirad 379 | 3.5 | 3.5 | 3.5 | 3.5 | 3.5 |  |  | 3.5 |
|  | Aminobenzoate-based | Esacure A198 |  |  |  |  |  | 3.5 |  |  |
|  |  | GENOPOL AB-2 |  |  |  |  |  |  | 3.5 |  |
| Polymerization inhibitor |  | BHT | 0.1 | 0.1 | 0.1 | 0.1 | 0.1 | 0.1 | 0.1 | 0.1 |
| Surface modifier |  | BYK UV3510 | 0.4 | 0.4 | 0.4 | 0.4 | 0.4 | 0.4 | 0.4 |  |
|  |  | BYK 361N |  |  |  |  |  |  |  | 0.4 |
| Total amount |  |  | 100 | 100 | 100 | 100 | 100 | 100 | 100 | 100 |
| Ratio | Formula (A) compound/EO-TPO ratio |  | 4.0 | 4.0 | 4.0 | 4.0 | 4.0 | 4.0 | 4.0 | 4.0 |
|  | EO-TPO/Other acylphosphine oxide ratio |  | 1.4 | 1.4 | 1.4 | 1.4 | 1.4 | 1.4 | 1.4 | 1.4 |
| Evaluation result | Thick film curability |  | 3 | 3 | 4 | 5 | 5 | 4 | 4 | 4 |
|  | Thin film curability |  | 3 | 4 | 5 | 5 | 5 | 4 | 4 | 3 |
|  | Flexibility |  | 5 | 5 | 5 | 5 | 3 | 3 | 4 | 3 |
|  | Continuous discharge stability |  | 5 | 5 | 5 | 5 | 4 | 4 | 3 | 3 |

|  |  |  | Comparative example 1 | Comparative example 2 | Comparative example 3 | Comparative example 4 | Comparative example 5 |
|---|---|---|---|---|---|---|---|
| Black pigment dispersion |  | Type | A | A | A | A | A |
|  |  | Addition amount | 12.5 | 12.5 | 12.5 | 12.5 | 12.5 |
| Polymerizable monomer | Compound represented by General formula (A) | Photomer 4050 |  |  | 30 | 26 | 20 |
|  |  | Photomer 4054 |  |  |  |  |  |
|  |  | VEEA |  |  | 20 | 10 | 25 |
|  | Other polymerizable monomer | EO chain/PO chain as main skeleton | Miramer M286 | 20 |  |  |  |  |
|  |  |  | EGDA |  | 20 |  |  |  |
|  |  | Difunctional monomer | SR506 | 55 | 55 | 25 | 41 | 30 |
|  |  |  | NPG(PO)DA |  |  |  |  |  |
|  |  | Other components | Photomer 4017 |  |  |  |  |  |
|  |  |  | PEA |  |  |  |  |  |
|  |  |  | TMP(EO)TA |  |  |  |  |  |
| Photo polymerization initiator | EO-TPO | Omnirad TPO-L | 5 | 5 | 5 | 3 |  |
|  |  | OMNIPOL TP |  |  |  |  |  |
|  | Other acylphosphine oxide-based | Omnirad 819 | 3.5 | 3.5 | 3.5 | 3.5 | 3.5 |
|  |  | Omnirad TPO |  |  |  |  |  |
|  |  | Omnirad 403 |  |  |  |  |  |
|  | Benzophenone-based | Omnirad BMS |  |  |  |  |  |
|  | Indane-based | SpeedCure XFs01 |  |  |  |  | 5 |
|  | Alkylaminoacetophenone-based | Omnirad 379 | 3.5 | 3.5 | 3.5 | 3.5 | 3.5 |
|  | Aminobenzoate-based | Esacure A198 |  |  |  |  |  |
|  |  | GENOPOL AB-2 |  |  |  |  |  |
| Polymerization inhibitor |  | BHT | 0.1 | 0.1 | 0.1 | 0.1 | 0.1 |
| Surface modifier |  | BYK UV3510 | 0.4 | 0.4 | 0.4 | 0.4 | 0.4 |
|  |  | BYK 361N |  |  |  |  |  |
| Total amount |  |  | 100 | 100 | 100 | 100 | 100 |
| Ratio | Formula (A) compound/EO-TPO ratio |  | 0.0 | 0.0 | 10.0 | 12.0 | — |
|  | EO-TPO/Other acylphosphine oxide ratio |  | 1.4 | 1.4 | 1.4 | 0.9 | 0.0 |
| Evaluation result | Thick film curability |  | 2 | 3 | 2 | 2 | 1 |
|  | Thin film curability |  | 3 | 2 | 3 | 2 | 1 |
|  | Flexibility |  | 5 | 1 | 3 | 2 | 2 |
|  | Continuous discharge stability |  | 1 | 5 | 3 | 4 | 4 |

The details of the materials used in Table 1 are as shown below.

<Polymerizable Monomer>

Photomer 4050: polyethylene glycol 200 diacrylate (manufactured by IGM RESINS B.V.) (n≈4 in General formula (A))

Photomer 4054: polyethylene glycol 400 diacrylate (manufactured by IGM RESINS B.V.) (n≈9 in General formula (A))

VEEA: 2-(2-vinyloxyethoxy)ethyl acrylate (manufactured by NIPPON SHOKUBAI CO., LTD.)

Miramer M286: polyethylene glycol 600 diacrylate (manufactured by Miwon Specialty Chemical Co., Ltd) (n≈14 in General formula (A))

EDGA: ethylene glycol diacrylate (manufactured by FUJIFILM Wako Pure Chemical Corporation)

SR508: dipropylene glycol diacrylate (manufactured by Arkema S.A)

NPG(PO)DA: PO-modified neopentyl glycol diacrylate (manufactured by Sartomer Co., Ltd., number of moles of PO group added: 2)

Photomer 4017: 1,6-hexanediol diacrylate (manufactured by IGM RESINS B.V.)

PEA: 2-phenoxyethyl acrylate

TMP(EO)TA: trimethylolpropane EO-modified triacrylate

<Photopolymerization Initiator>

Omnirad TPO-L: ethoxyphenyl(2,4,6-trimethylbenzoyl) phosphine oxide manufactured by IGM RESINS B.V.)

OMNIPOL TP: ethoxyphenyl(2,4,6-trimethylbenzoyl) phosphine oxide multimer (manufactured by IGM RESINS B.V.)

Omnirad 819: bis(2,4,6-trimethylbenzoyl)-phenylphosphine oxide (manufactured by IGM RESINS B.V.)

Omnirad TPO: 2,4,6-trimethylbenzoyl-diphenylphosohine oxide (manufactured by IGM RESINS B.V.)

Omnirad 403: bis(2,6-dimethoxybenzoyl)-2,4,4-trimethylpentylphosphine oxide (manufactured by IGM RESINS B.V.)

Omnirad BMS: [4-(methylphenylthio)phenyl]-phenylmethane (manufactured by IGM RESINS B.V.)

SpeedCure XFs01: 2-hydroxy-1-{1-[4-(2-hydroxy-2-methylpropionyl)phenyl]-1,3,3-trimethylindane-5-yl}-2-methylpropane-1-one (manufactured by LAMBSON LIMITED)

Omnirad 379: 2-dimethylamino-2-(4-methylbenzyl)-1-(4-morpholinophenyl)-1-butanone (manufactured by IGM RESINS B.V.)

Esacure A198: aminobenzoate-based compound (manufactured by IGM RESINS B.V.)

GENOPOL AB-2: aminobenzoate-based compound (manufactured by Rahn AG)

<Polymerization Inhibitor>

BHT: 2,6-di-tert-butyl-4-methylphenol ("BHT SWANOX" manufactured by Seiko Chemical Co., Ltd.)

<Other Additives>

BYK UV3510: silicone-based surface tension modifier manufactured by BYK Chemie Japan KK BYK 361N: acrylic-based surface tension modifier manufactured by BYK Chemie Japan KK 2. Preparation of Printed Matter The prepared ink was used and the printed matter was produced as follows.

An inkjet discharge apparatus ("OnePass JET" manufactured by Tritek Co., Ltd.) fitted with an inkjet head manufactured by KYOCERA Corporation (resolution: 600 dpix 600 dpi) and an ultraviolet lamp for final curing was filled with ink. Subsequently, a solid image having a print rate of 100%, and, a halftone solid image having a print rate of 30% were printed on a PET substrate "PET50(K2411)" manufactured by Lintec Corporation under the printing conditions of a discharge droplet volume of 14 pl and a printing speed 50 m/min. Note that, a 240 W/cm metal halide lamp manufactured by GEW Ltd. was used as the ultraviolet lamp for final curing. Moreover, the output was adjusted in advance so as to make the integrated light quantity to 200 mJ/cm$^2$ when performing the following curability evaluation, and, so as to make the integrated light quantity to 1000 mJ/cm$^2$ when performing the flexibility evaluation.

Examples 1 to 40 and Comparative Examples 1 to 5

The prepared inks and printed matters were used to perform the evaluations illustrated below. The evaluation results are as shown in Table 1.

[Thick Film Curability Evaluation]

In the printing of a solid image having a print rate of 100%, the printed matter was passed directly under the ultraviolet lamp a plurality of times. At this time, the printed matter surface was rubbed with a cotton swab after each pass, and the number of passes until the uncured ink did not adhere to the cotton swab was verified. The evaluation criteria are as follows, and grades of 3 or more were deemed to be practicable.

5. uncured ink did not adhere to the cotton swab at the time after 1 pass

4: uncured ink did not adhere to the cotton swab at the time after 2 passes

3: uncured ink did not adhere to the cotton swab at the time after 3 passes

2: uncured ink did not adhere to the cotton swab at the time after 4 passes

1: it was necessary to pass the printed matter directly under the ultraviolet lamp 5 or more times until the uncured ink did not adhere to the cotton swab

[Thin Film Curability Evaluation]

In the printing of a halftone solid image having a print rate of 30%, the printed matter was passed directly under the ultraviolet lamp a plurality of times. At this time, the printed matter surface was rubbed with a cotton swab after each pass, and the number of passes until the uncured ink did not adhere to the cotton swab was verified. The evaluation criteria are as follows, and grades of 3 or more were deemed to be practicable.

5: uncured ink did not adhere to the cotton swab at the time after 1 pass

4: uncured ink did not adhere to the cotton swab at the time after 2 passes

3: uncured ink did not adhere to the cotton swab at the time after 3 passes

2: uncured ink did not adhere to the cotton swab at the time after 4 passes

1: it was necessary to pass the printed matter directly under the ultraviolet lamp 5 or more times until the uncured ink did not adhere to the cotton swab

[Flexibility Evaluation]

The prepared solid printed matter was bent 180° C., then returned to the original state, and it was verified visually whether or not cracks occurred on the coating film surface. Moreover, the aforementioned evaluation was performed five times, and the number of times cracks were verified was counted. The evaluation criteria are as follows, and grades of 3 or more were deemed to be practicable.

5: No cracks were verified five times

4: Cracks were verified one time out of five

3: Cracks were verified two times out of five

2: Cracks were verified 3 or 4 times out of five

1: Cracks were verified 5 times

[Continuous Discharge Stability Evaluation]

A jig equipped with an inkjet head ("CA4" manufactured by Toshiba Tec Corp, 318 nozzles) capable of temperature adjustment was filled with the manufactured ink. Subsequently, the temperature of the head was controlled such that the ink viscosity during discharge became 8 to 9 mPa·s, and continuous discharge was performed at 6 kHz. Moreover, the number of nozzles where discharge was not possible (nozzle loss number) was verified before and after continuous discharge for 30 minutes. The evaluation criteria are as follows, and grades of 3 or more were deemed to be practicable.

5: The nozzle loss number was 0 or 1

4: The nozzle loss number was 2 or 3

3: The nozzle loss number was 4 or 5

2: The nozzle loss number was 5 to 10

1. The nozzle loss number was 11 or more

In Table 1, Examples 1 to 40 comprise the compound represented by General formula (A) and EO-TPO, the blending ratio thereof is 2:1 to 8.5:1 by mass ratio, and all of the evaluation items had grades of 3 or more. On the one hand, Comparative example 1 contains a compound which while represented by General formula (A) has an n greater than 10, and the thick film curability and the discharge stability had poor results. Conversely, Comparative example 2 contains a compound having a structure which while represented by General formula (A) has an n of 1, and the flexibility greatly deteriorated. Further, in Comparative example 3, the ratio of the compound represented by General formula (A) and EO-TPO was 10:1 by mass ratio, and the thick film curability deteriorated. Similarly, in Comparative example 4, the ratio of the compound represented by General formula (A) and EO-TPO was 12:1 which greatly exceeds the range prescribed in the embodiment of the present invention, and while the discharge stability was maintained, the curability and the flexibility had poor results. Furthermore, Comparative example 5 did not contain EO-TPO, and the curability greatly deteriorated.

The invention claimed is:

1. An ultraviolet curable inkjet ink comprising a colorant, a polymerizable monomer, and a photopolymerization initiator, wherein
the polymerizable monomer comprises a compound represented by the following General formula (A),
the photopolymerization initiator comprises
an ethoxyphenyl(2,4,6-trimethylbenzoyl)phosphine oxide, and
an acylphosphine oxide photopolymerization initiator different than the ethoxyphenyl(2,4,6-trimethylbenzoyl)phosphine oxide,
the ratio of the content of the compound represented by the General formula (A) and the content of the ethoxyphenyl(2,4,6-trimethylbenzoyl)phosphine oxide is 2:1 to 8.5:1 by mass ratio,
the ratio of the content of the ethoxyphenyl(2,4,6-trimethylbenzoyl)phosphine oxide and the content of the acylphosphine oxide photopolymerization initiator is 0.5:1 to 3:1 by mass ratio, and
the content of a monofunctional monomer in the ultraviolet curable inkjet ink is 25% by mass or less,

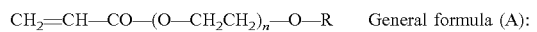  General formula (A):

wherein in General formula (A), R represents an acryloyl group or a vinyl group, and n represents an integer from 2 to 10,
wherein the acylphosphine oxide photopolymerization initiator different than the ethoxyphenyl(2,4,6-trimethylbenzoyl)phosphine oxide comprises bis(2,4,6-trimethylbenzoyl)-phenylphosphine oxide, and
wherein the content of the compound represented by the General formula (A) in the ultraviolet curable inkjet ink is 8 to 20% by mass.

2. The ultraviolet curable inkjet ink according to claim 1, further comprising a polyether-modified siloxane surface modifier.

3. The ultraviolet curable inkjet ink according to claim 1, wherein R in the General formula (A) is an acryloyl group.

4. The ultraviolet curable inkjet ink according to claim 2, wherein R in the General formula (A) is an acryloyl group.

5. The ultraviolet curable inkjet ink according to claim 1, wherein the content of a trifunctional or greater monomer in the ultraviolet curable inkjet ink is 2% by mass or less.

6. An ultraviolet curable inkjet ink comprising a colorant, a polymerizable monomer, and a photopolymerization initiator, wherein
the polymerizable monomer comprises a compound represented by the following General formula (A),
the photopolymerization initiator comprises
an ethoxyphenyl(2,4,6-trimethylbenzoyl)phosphine oxide, and
an acylphosphine oxide photopolymerization initiator different than the ethoxyphenyl(2,4,6-trimethylbenzoyl)phosphine oxide,
the ratio of the content of the compound represented by the General formula (A) and the content of the ethoxyphenyl(2,4,6-trimethylbenzoyl)phosphine oxide is 2:1 to 8.5:1 by mass ratio,
the ratio of the content of the ethoxyphenyl(2,4,6-trimethylbenzoyl)phosphine oxide and the content of the acylphosphine oxide photopolymerization initiator is 0.5:1 to 3:1 by mass ratio,
the content of a monofunctional monomer in the ultraviolet curable inkjet ink is 25% by mass or less, and
the content of a trifunctional or greater monomer in the ultraviolet curable inkjet ink is 2% by mass or less,

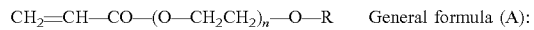  General formula (A):

wherein in General formula (A), R represents an acryloyl group or a vinyl group, and n represents an integer from 2 to 10.

7. The ultraviolet curable inkjet ink according to claim 6, further comprising a polyether-modified siloxane surface modifier.

8. The ultraviolet curable inkjet ink according to claim 6, wherein R in the General formula (A) is an acryloyl group.

9. The ultraviolet curable inkjet ink according to claim 6, wherein the content of the compound represented by the General formula (A) in the ultraviolet curable inkjet ink is 8 to 20% by mass.

* * * * *